United States Patent
Burke

[11] 3,873,179
[45] Mar. 25, 1975

[54] LITHIUM NIOBATE HOLOGRAM READOUT USING CONTINUOUS INCOHERENT NOISE ERASING LIGHT

[75] Inventor: William Joseph Burke, Princeton Junction, N.J.

[73] Assignee: RCA Corporation, New York, N.Y.

[22] Filed: June 10, 1974

[21] Appl. No.: 477,851

[52] U.S. Cl. .............................. 350/3.5, 350/160 P
[51] Int. Cl. ............................................ G02b 27/00
[58] Field of Search ..................... 350/3.5, 160 P; 340/173 LT, 173 CC; 96/90 PC

[56] References Cited
UNITED STATES PATENTS
3,799,642  3/1974  Phillips et al. ...................... 350/3.5

Primary Examiner—Ronald J. Stern
Assistant Examiner—Jon W. Henry
Attorney, Agent, or Firm—George J. Seligsohn; Edward J. Norton

[57] ABSTRACT

Spurious optical damage on readout of volume holograms stored in crystals, such as Fe-doped $LiNbO_3$ is minimized by illuminating the crystal with broadband incoherent wave energy while the crystal is being illuminated with a readout input beam of coherent wave energy of a given wavelength, and placing a narrow band filter in the path of the derived readout image beam which passes coherent wave energy incident thereon having the given wavelength but substantially blocks out the broadband incoherent wave energy incident thereon.

5 Claims, 1 Drawing Figure

VOLUME HOLOGRAM READOUT SYSTEM

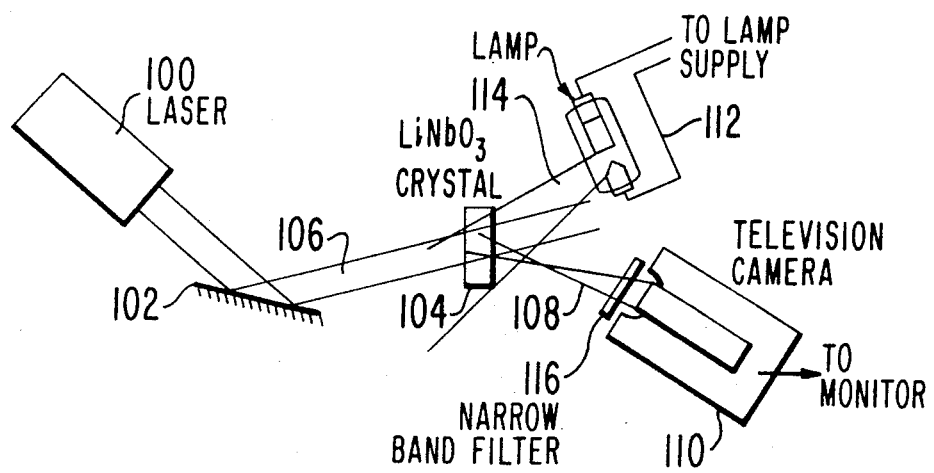
VOLUME HOLOGRAM READOUT SYSTEM

LITHIUM NIOBATE HOLOGRAM READOUT USING CONTINUOUS INCOHERENT NOISE ERASING LIGHT

The invention herein described was made in the course of or under a contract or subcontract thereunder with the Department of the Navy.

This invention relates to an improved system for reading out and displaying information stored in a volume hologram and, more particularly, to an arrangement used to minimize spurious optical damage on readout of volume holograms stored in crystals, such as Fe-doped $LiNbO_3$.

Reference is made to the copending U.S. patent application Ser. No. 412,611, filed Nov. 5, 1973 by Burke et al for a Volume Hologram Information Retrieval System and assigned to the same assignee as the present invention. Patent application Ser. No. 412,611 discloses a system for reading out a volume hologram storage medium, having a high packing density of information stored therein, which makes use of a closed-circuit television display sub-system employing a silicon storage tube. The system disclosed in the aforesaid U.S. patent application Ser. No. 412,611, which is particularly suitable for a moving map display system for use in an aircraft cockpit, makes it possible to obtain displays of sufficient brightness from the readout of high-packing density volume hologram storage mediums, which inherently have a low optical readout efficiency. The preferred volume hologram storage medium employed in the system of the aforesaid patent application Ser. No. 412,611 is a crystal of Fe-doped $LiNbO_3$. A laser readout beam of suitable wavelength is employed for reading out a volume hologram storage medium composed of such a crystal.

It has been found that, during readout, the laser readout beam illuminating the crystal produces two undesirable side effects. First, spurious light scattering and/or optical damage occurs due to interference of the illuminating readout beam with components of the illuminating readout beam which have been scattered or diffracted in the optical system. Second, interference of the readout image output beam with the illuminating readout input beam in the storage medium produces an "enhanced" hologram which has different angular properties than the original hologram, which leads to a distortion of the viewed image. Both of these two undesirable side effects occur at room temperature, are not fixed, and can be erased with incoherent illumination (tungsten filament, or mercury, or xenon arcs, for example). two-frame color-encoded In the past, it has been the practice to read out a set of holograms from the crystal for a period of time. During this period of time, a certain amount of damage accumulates within the crystal. When the image quality becomes unacceptable, because of the damage, the readout is stopped and the crystal is exposed to the incoherent illumination to erase the damage. Unfortunately, this process takes a period of hours and, therefore, cannot be tolerated in a moving map display system or in other practical display systems employing volume hologram storage. This effect is particularly serious when holograms of two-frame-encoded transparencies are recorded. The coded chrominance information of such a transparency is particularly sensitive to noise upon readout and, thus, small amounts of damage, of the type discussed above, degrades the color displayed, after decoding, on a kinescope.

In accordance with the present invention, an arrangement is provided in which the optical damage is minimized in situ in a readout system which uses a television camera tube as the detecting element or, alternatively, uses a direct view set-up. The arrangement of the present invention permits continuous erasure of any damage which occurs, so that the amount of damage never accumulates to the point where the displayed image may become degraded. Briefly, this is accomplished by illuminating the crystal with incoherent light at the same time that a hologram is being read out with a laser readout beam, and at the same time employing a narrow band filter whose peak transmission is at the wavelength of the readout laser beam. The narrow band filter blocks substantially all of the incoherent illumination, but allows the image-carrying laser wavelength to pass through with very little attenuation.

These and other features and advantages of the present invention will become more apparent from the following detailed description taken together with the accompanying drawing, in which the sole FIGURE is a block diagram of an illustrative embodiment of the present invention.

As shown in the drawing, the volume hologram readout system of the present invention includes, as is conventional laser 100 and optical elements, such as mirror 102, for illuminating a volume hologram storage medium, such as $LiNbO_3$ crystal 104, with coherent readout beam 106 from laser 100. As is also conventional in such volume hologram readout systems, the resulting readout image beam 108 of the hologram then being read out causes an image of the scene manifested by that hologram to be reconstructed on the photocathode of a camera tube of television camera 110. The output from camera 110 is applied to a television monitor (not shown) to display the scene manifested by the reconstructed hologram on the kinescope thereof. If the display is to be in black and white, the camera tube of television camera 110 may be a standard vidicon. However, in the case where the display is to be in color, the camera tube may include a split photocathode having a first portion on which a pattern manifesting the coded chrominance information on the scene is detected and a second portion in which the luminance portion of the scene is detected. Such a camera tube employs two synchronized scanning electron beams for simultaneously reading out corresponding chrominance and luminance points in the two portions of the photocathode. In any event, the specific details of camera tube 110 form no part of the present invention.

The volume hologram readout system shown in the drawing differs from a conventional volume hologram readout system by further including lamp 112 (e.g., a tungsten filament, mercury or xenon arc lamp) for illuminating crystal 104 with broad band incoherent light beam 114, while crystal 104 is being illuminated with coherent readout beam 106 from laser 100. In addition, the volume hologram readout system of the present invention differs from conventional volume hologram readout systems by including narrow band filter 116 situated, as shown, in front of the photodetecting surface of television camera 110. Narrow band filter 116 has a passband of only about 5A, centered substantially at the wavelength of coherent readout illuminating beam 106 from laser 100. Therefore, narrow band filter 116 provides peak transmission for the laser wavelength of readout image beam 108, so that it passes through to the detecting target of camera 110, but blocks substantially all the incoherent illumination from beam 114 scattered by crystal 104 towards narrow band filter 116. With the arrangement shown in the drawing, the build-up of optical damage is suppressed, without any washing out of the displayed image with incoherent light.

Although the volume hologram readout system shown in the drawing employs a television camera to detect the reconstructed hologram image, it would be obvious to one skilled in the art that the arrangement of the present invention may also be used in a direct viewing set-up by insertion of narrow band filter 116 at an appropriate aperture point in the imaging system.

What is claimed is:

1. In a readout system for a volume hologram including a volume hologram recording medium comprising a given crystal of Fe-doped $LiNbO_3$ which has a volume hologram of a given scene recorded therein, means for illuminating said crystal with a readout input beam of coherent wave energy of said given wavelength to derive from said recorded volume hologram therein a readout image beam of coherent wave energy of said given wavelength which reconstructs an image of said given scene, and viewing means in cooperative relationship with said readout image beam for viewing said reconstructed image of said given scene, wherein said given crystal exhibits a response to the cumulative illumination thereof by said readout input beam which results in spurious cumulative recordings within said crystal and exhibits a response to the cumulative illumination thereof by given broad-band incoherent wave energy which results in cumulative erasing of said spurious recordings within said crystal; the improvement therewith comprising:

a. a source of said given broad-band incoherent wave energy for illuminating said given crystal therewith while simultaneously said given crystal is being illuminated with said readout input beam of coherent wave energy of said given wavelength, and b. wherein said viewing means includes a narrow-band filter located in the path of said readout image beam for passing wave energy incident thereon having said given wavelength and substantially blocking out said given incoherent wave energy incident thereon.

2. The system defined in claim 1, wherein said narrow-band filter has a passband of substantially 5A which is peaked at substantially said given wavelength.

3. The readout system defined in claim 1, wherein said viewing means includes a television camera for picking up said reconstructed image of said given scene, said narrow-band filter being situated between said given crystal and said television camera to substantially prevent any of said broadband incoherent wave energy from being picked up by said television camera.

4. A method for preventing optical damage from occurring in a given crystal of Fe-doped $LiNbO_3$ during readout of a volume hologram recorded in a volume hologram recording medium comprising said given crystal with a readout input beam of coherent wave energy of a given wavelength, said method comprising the steps of:

a. illuminating said given crystal with broadband wave energy while simultaneously said given crystal is being illuminated by said readout input beam, and b. filtering the readout image beam derived by said given crystal to pass wave energy of said given wavelength but substantially block out said broadband incoherent wave energy.

5. The method defined in claim 4, wherein said given crystal is continuously illuminated with said broadband wave energy while said given crystal is being illuminated by said readout input beam.

* * * * *